(12) United States Patent
Dunn

(10) Patent No.: US 7,951,339 B1
(45) Date of Patent: May 31, 2011

(54) CLOSED BRAYTON CYCLE DIRECT CONTACT REACTOR/STORAGE TANK WITH $O_2$ AFTERBURNER

(75) Inventor: Paul M. Dunn, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 07/926,200

(22) Filed: Aug. 7, 1992

(51) Int. Cl.
*F28D 21/00* (2006.01)
*F01K 25/06* (2006.01)

(52) U.S. Cl. .......................................... 422/207; 60/650

(58) Field of Classification Search ............... 114/202; 60/39.02, 39.05, 39.461, 682, 650, 259, 260, 60/683, 772, 775; 422/207
See application file for complete search history.

(56) References Cited

U.S. PATENT DOCUMENTS

| | | | | |
|---|---|---|---|---|
| 1,688,761 A | * | 10/1928 | Sperry | 60/39.05 |
| 3,101,592 A | * | 8/1963 | Robertson et al. | 60/39.05 |
| 3,134,228 A | * | 5/1964 | Wolansky et al. | 60/39.461 |
| 3,657,879 A | * | 4/1972 | Ewbank et al. | 60/39.05 |
| 4,680,934 A | * | 7/1987 | Short | 114/20.2 |
| 5,117,635 A | * | 6/1992 | Blau | 114/20.2 |
| 5,131,231 A | * | 7/1992 | Trimble et al. | 60/650 |
| 5,177,952 A | * | 1/1993 | Stone | 60/39.05 |

FOREIGN PATENT DOCUMENTS

JP        09032577 A  *  2/1997

* cited by examiner

*Primary Examiner* — Timothy D Collins
*Assistant Examiner* — Joseph W Sanderson
(74) *Attorney, Agent, or Firm* — James M. Kasischke; Michael P. Stanley; Jean-Paul A. Nasser

(57) ABSTRACT

A closed cycle Brayton direct contact reactor/storage tank uses an afterburner to assist in removing metal vapors from the working fluid. The direct contact reactor/storage tank operates by bubbling an inert gas through liquid metal fuel. The inert gas picks up metal vapors from the fuel. The afterburner comprises a predetermined amount of oxygen, $O_2$, being fed to a filter cavity within the reactor/storage tank and having the metal vapors react directly with the $O_2$ forming a solid oxide that remains and does not circulate as part of the working fluid throughout the external parts of the Brayton cycle outside of the reactor/storage tank causing damage to system components.

13 Claims, 1 Drawing Sheet

CLOSED BRAYTON CYCLE DIRECT CONTACT REACTOR/STORAGE TANK WITH O₂ AFTERBURNER

STATEMENT OF GOVERNMENT INTEREST

The invention described herein may be manufactured and used by or for the Government of the United States of America for governmental purposes without the payment of any royalties thereon or therefor.

This patent application is copending with the related applications by the same inventor filed on the same date as subject patent entitled Closed Cycle Brayton Propulsion System with Direct Heat Transfer, Ser. No. 07/926,116, filed 7 Aug. 1992, Closed Brayton Cycle Direct Contact Reactor/Storage Tank with Chemical Scrubber, Ser. No. 07/926,090, filed 7 Aug. 1992, Semiclosed Brayton Cycle Power System with Direct Heat Transfer, Ser. No. 07/926,199, filed 7 Aug. 1992, and Semiclosed Brayton Cycle Power System with Direct Combustion Heat Transfer, Ser. No. 07/926,115, filed 7 Aug. 1992.

BACKGROUND OF THE INVENTION (1) Field of the Invention

The present invention relates to metal vapor control of the liquid metal fuel used in a direct contact Brayton cycle power system. More particularly the invention relates to a system for eliminating metal vapor at the working gas outlet of a closed Brayton cycle direct contact reactor/storage tank by use of an $O_2$ afterburner.

(2) Description of the Prior Art

My invention titled Closed Cycle Brayton Propulsion System with Direct Heat Transfer, with which this application is copending, discloses the use of the more efficient Brayton cycle instead the Rankine cycle in a closed cycle underwater propulsion system. The size and weight penalty of the Brayton cycle's hot side heat exchanger is eliminated by use of direct contact heat transfer between the working fluid which is an inert gas such as helium, argon, xenon, or a mixture of inert gases, and a liquid metal bath of a material such as lithium, sodium, potassium, aluminum, magnesium, or an alloy thereof.

The closed cycle Brayton power system with direct heat transfer invention as disclosed in copending application, Navy Case No. 71843, has the problem that some of the liquid metal fuel vapor will be carried from the reactor/fuel exchanger into the working fluid stream. The volume fraction of metal vapor is relatively low; however, during a long run of the power cycle the metal accumulation can damage the regenerator, cooler, turbine, or compressor. The volume fraction of the vapor present is equal to the ratio of the partial pressure of the liquid metal to the system operating pressure, i.e. for aluminum @ 2343° F., 1 mm Hg/~800 psi=$1.6 \times 10^{-6}$, for lithium @ 2323° F., 400 mm Hg/~800 psi=$6.5 \times 10^{-4}$.

SUMMARY OF THE INVENTION

Accordingly, it is a general purpose and object of the present invention to provide an improved reactor/storage tank for use in a direct contact closed Brayton cycle power system. It is a further object to provide metal vapor control within the reactor/storage tank to remove contaminants, such as metal fuel vapors, from the working fluid stream. Another object is to provide longer life in the power system components that come in contact with the working fluid.

These and other objects are accomplished with the present invention by providing a system in which $O_2$ is fed into the reactor/storage tank's filter cavity. This causes the metal vapors in the circulating working fluid stream to react directly with the $O_2$ forming a low volume of solid oxide particles at the closed Brayton cycle operating temperatures and pressures. These solid oxide particles settle out of the working gas before it exits the filter cavity.

BRIEF DESCRIPTION OF THE DRAWING

A more complete understanding of the invention and many of the attendant advantages thereto will be readily appreciated as the invention becomes better understood by reference to the following detailed description when considered in conjunction with the accompanying drawings wherein.

DESCRIPTION OF THE PREFERRED EMBODIMENT

Figure 1:
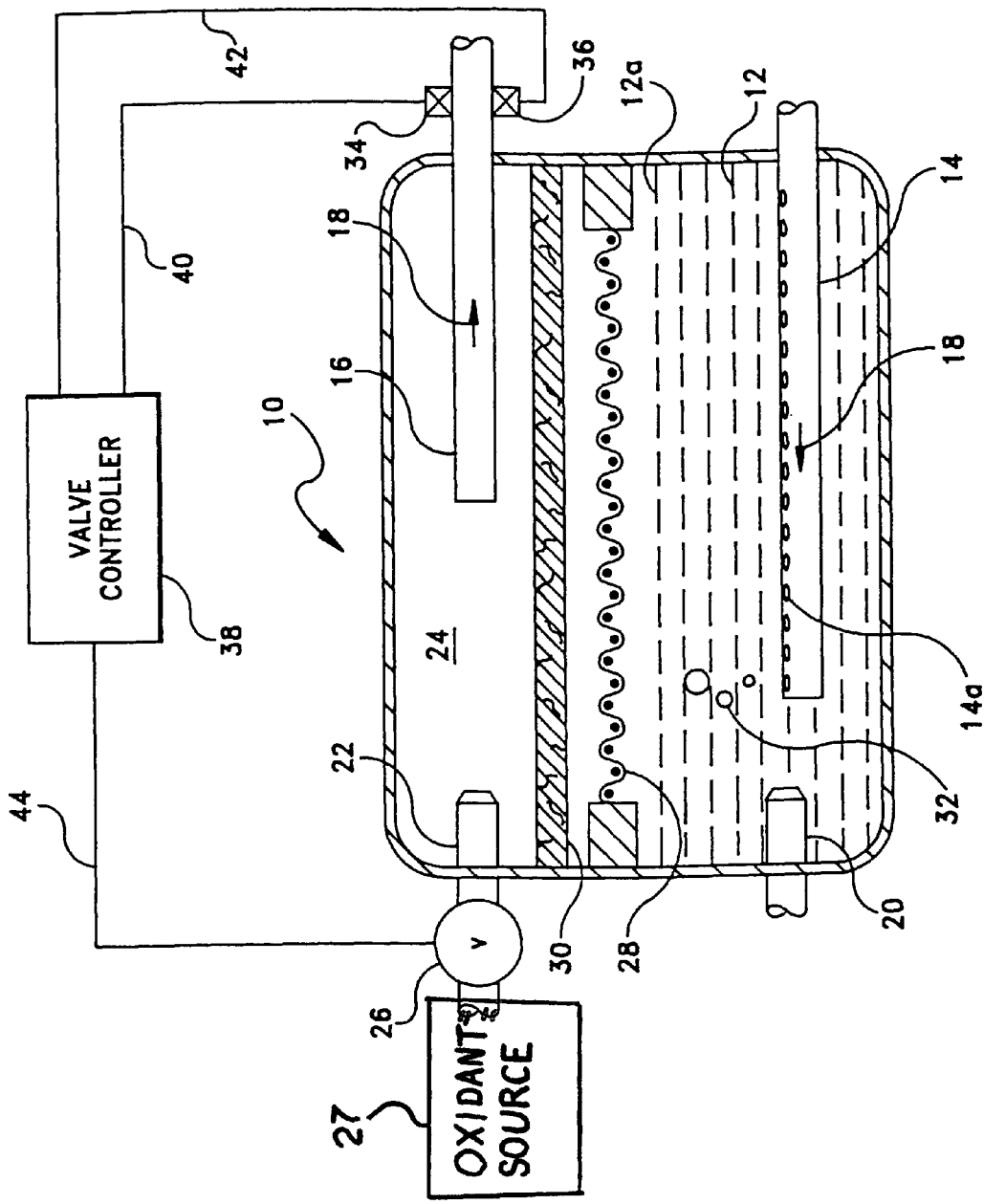
FIG. 1 is a diagram of a closed Brayton direct contact reactor/storage tank with an $O_2$ afterburner in accordance with the present invention.

Referring now to FIG. 1 there is shown a reactor/storage tank 10 for transferring heat from a liquid metal fuel 12 to a working gas in a closed Brayton cycle power system. Although the terminology reactor/storage tank and direct contact reactor/storage tank are used to describe component 10, names such as heater/reactor housing and direct contact heater could be used.

In the preferred embodiment, a direct contact, metal reactor/storage tank is partially filled with a liquid metal fuel 12. Reactor/storage tank 10 has a working gas inlet 14 tube disposed in reactor/storage tank 10 below the surface 12a of liquid metal fuel 12 for the injection of the working gas directly into liquid metal fuel 12. Working gas inlet 14 is a tube extending into reactor/storage tank 10 with a plurality of apertures 14a therein, disposed along the length thereof. Similarly, a working gas outlet tube 16 is disposed in reactor/storage tank 10 above surface 12a of liquid metal fuel 12 for the ejection of the working gas from reactor/storage tank 10. The flow of the working gas is designated generally by flow arrows 18. Also disposed within reactor/storage tank 10 is an oxidant injector tube 20. An oxidant is introduced through injector tube 20 into liquid metal fuel 12 where it reacts with fuel 12 to produce heat. An afterburner oxygen injector tube 22 is disposed in a filter cavity 24 above the surface 12a of liquid metal fuel 12 for supplying an oxidant to filter cavity 24. An electrically controllable oxidant injector control valve 26 communicates with an oxidant source 27 for supplying an oxidant to afterburner oxidant injector 22 in filter cavity 24.

The oxidizing agent or oxidant in the preferred embodiment is oxygen, $O_2$. The reaction between oxygen and an aluminum-magnesium alloy liquid metal fuel provides the preferred means of generating heat within reactor/storage tank 10. The working gas is normally argon or a mixture of helium and xenon. Helium, argon and xenon are inert gases and therefore do not react with a metal fuel. Other possible choices for metal fuels include alkali metals, such as lithium, sodium or potassium.

Disposed within the reactor/storage tank 10 between liquid metal fuel 12 and working gas outlet tube 16 is a screen assembly 28 for preventing liquid metal fuel 12 from splattering into working gas outlet tube 16. A filter 30, which further prevents contaminants within the working gas from entering working gas outlet tube 16, is disposed between screen assembly 28 and working gas outlet tube 16. Typically, filter 30 is a ceramic fiber insulation filter.

In operation, after the metal fuel is heated to the liquid state, the working gas is injected through working gas inlet 14 into reactor/storage tank 10. The working gas then bubbles through liquid metal fuel 12. Representative working gas bubbles 32 are shown leaving aperture 14a and expanding toward surface 12a of liquid metal fuel 12. Heat is transferred directly from liquid metal fuel 12 to the working gas. During this process metal vapors are formed.

When the oxidant, preferably $O_2$, is injected into filter cavity 24 the metal vapors react directly with the oxidant while still inside filter cavity 24. The small volume of solid metal oxide formed precipitates from the working gas, and remains on filter 30, thereby removing the metal vapors from the working fluid. A high temperature oxidant sensor 34, such as is used in automotive emission controls, and a temperature sensor 36 are disposed within working gas outlet 16 for detecting the presence of an oxidant in the exit stream. Oxidant sensor 34 and temperature sensor 36 are electrically connected to a valve controller 38 by oxidant sensor connection 40 and temperature sensor connection 42. Valve controller 38 is electrically connected to oxidant injector control valve 26 by valve control cable 44. Valve controller 38 reduces and increases the afterburner oxidant flow in response to the readings from oxidant sensor 34 and temperature sensor 36 to give a constant but very low concentration of oxidant in the exit gas stream.

The combination of screen assembly 28, filter 30 and the afterburner injector tube 22 effectively clean the working gas before it passes through outlet tube 16.

In alternative embodiments, the liquid fuel can be one of the alkali metals such as lithium, sodium, or potassium, and the oxidant can be a chlorofluorocarbon, such as $C_2F_3Cl_3$ known in the art as Freon-13. Chlorofluorocarbon oxidants cannot be used with aluminum-magnesium fuel, however, because the products of the oxidation reaction are gaseous at the operating temperature.

There has therefore been described a reactor/storage tank 10 that is used in a closed Brayton cycle. The reactor/storage tank has an afterburner injector tube 22 in filter cavity 24 that functions as an afterburner in the path of the working fluid to eliminate metal vapor from the working fluid. In the absence of this afterburner, any metal vapor present in the circulating working fluid plates out and eventually freezes at a point in the cycle where either the partial or total pressure of the gas stream is reduced, or the gas is cooled below the melting point of the vapor. These conditions occur in the turbine, regenerator, and cooler of the direct contact Brayton power cycle. The metal deposits can reduce heat transfer in the regenerator, damage the turbine, or cause a pressure drop in any of the components.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A reactor/storage apparatus for use in a closed Brayton cycle system comprising:
   a tank;
   a liquid metal fuel contained within said tank;
   an oxidant source having an oxidant contained therein, said oxidant causing a heat generating reaction with said liquid metal fuel;
   an oxidant injector penetrating said tank below the surface of said liquid metal fuel and in communication with said oxidant source for providing a controlled flow of said oxidant to said liquid metal fuel;
   a working gas;
   a working gas inlet penetrating said tank below the surface of said liquid metal fuel for dispersing said working gas into said liquid metal fuel wherein heat is transferred to said working gas by direct contact with said liquid metal fuel, said working gas passing through said liquid metal fuel and becoming contaminated with metal vapors from said liquid metal fuel;
   an afterburner oxidant injection means, penetrating said tank above said liquid metal fuel and in communication with said oxidant source, for providing a controlled flow of said oxidant within said tank above said liquid metal fuel so as to react with said metal vapors to form a solid product therefrom leaving said working gas free of said metal vapors; and
   a working gas outlet, penetrating said tank above said liquid metal fuel, for communicating said heated, metal vapor free, working gas to said Brayton cycle system.

2. A reactor/storage apparatus for use in a closed Brayton cycle system according to claim 1 further comprising:
   an oxidant sensor, disposed within said working gas outlet, for measuring the amount of oxidant present in said outlet;
   an oxidant control valve in communication with said oxidant afterburner injection means and with said oxidant source, said control valve being electrically controllable to reduce or increase the flow of said oxidant to said oxidant afterburner injection means; and
   a valve controller electrically connected to receive information from said oxidant sensor, said valve controller being electrically connected to said oxidant control valve for controlling the flow of oxidant to said oxidant afterburner injection means.

3. A reactor/storage apparatus for use in a closed Brayton cycle system according to claim 2 further comprising a temperature sensor disposed within said working gas outlet and for measuring the temperature of the ejected working gas.

4. A reactor/storage apparatus for use in a closed Brayton cycle system according to claim 3 wherein said liquid metal fuel comprises an aluminum magnesium alloy.

5. A reactor/storage apparatus for use in a closed Brayton cycle system according to claim 4 wherein said oxidant comprises oxygen.

6. A reactor/storage apparatus for use in a closed Brayton cycle system according to claim 5 wherein said working gas comprises an inert gas.

7. A reactor/storage apparatus for use in a closed Brayton cycle system according to claim 5 wherein said working gas comprises argon.

8. A reactor/storage apparatus for use in a closed Brayton cycle system according to claim 5 wherein said working gas comprises a mixture of helium and xenon.

9. A reactor/storage apparatus for use in a closed Brayton cycle system according to claim 3 wherein said liquid metal fuel comprises an alkali metal.

10. A reactor/storage apparatus for use in a closed Brayton cycle system according to claim 9 wherein said oxidant comprises a chlorofluorocarbon.

11. A reactor/storage apparatus for use in a closed Brayton cycle system according to claim 10 wherein said working gas comprises an inert gas.

12. A reactor/storage apparatus for use in a closed Brayton cycle system according to claim 10 wherein said working gas comprises argon.

13. A reactor/storage apparatus for use in a closed Brayton cycle system according to claim 10 wherein said working gas comprises a mixture of helium and xenon.

* * * * *